J. R. FARTHING.
SEED PLANTER.
APPLICATION FILED AUG. 5, 1911.
1,035,781.
Patented Aug. 13, 1912.
2 SHEETS—SHEET 1.
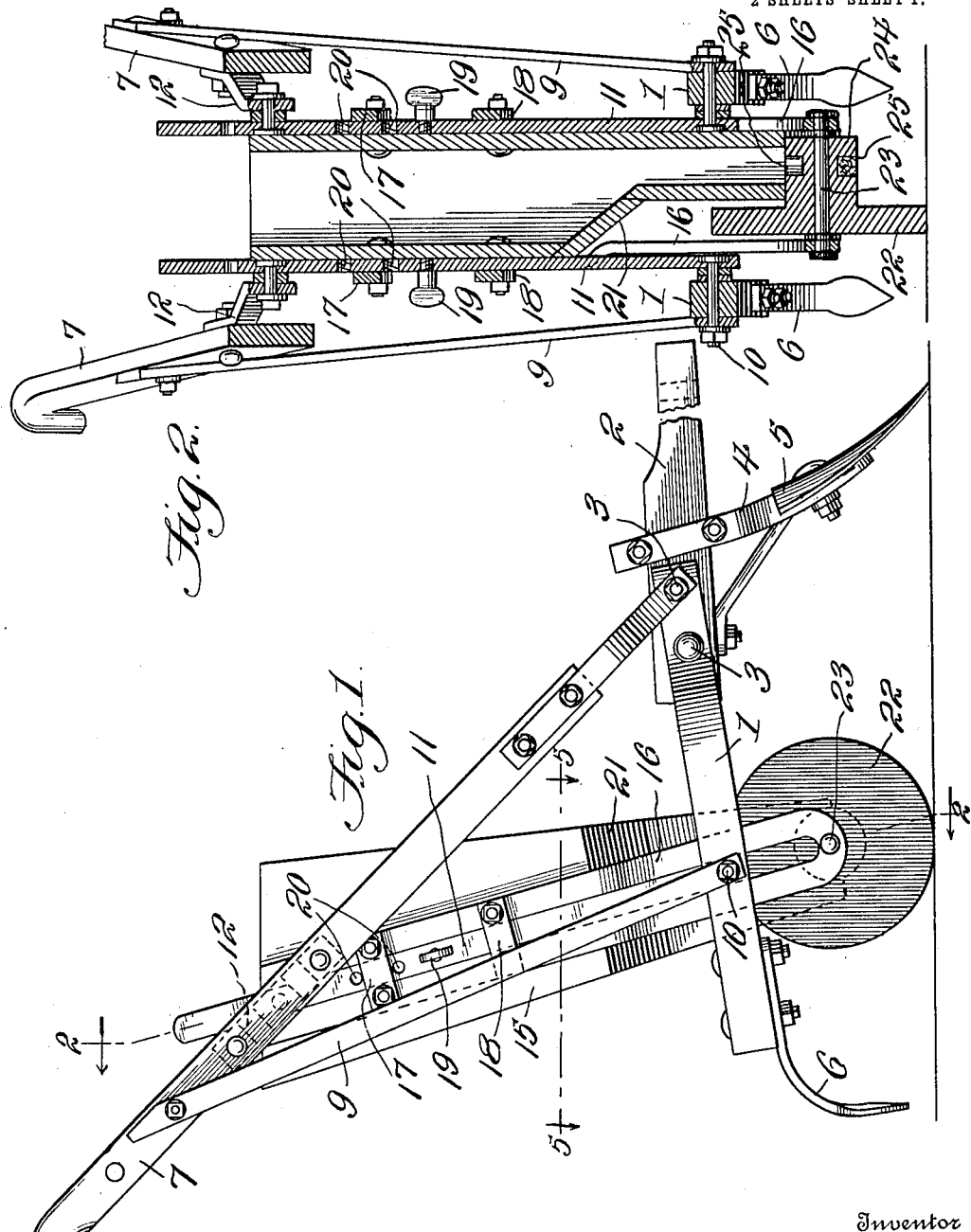

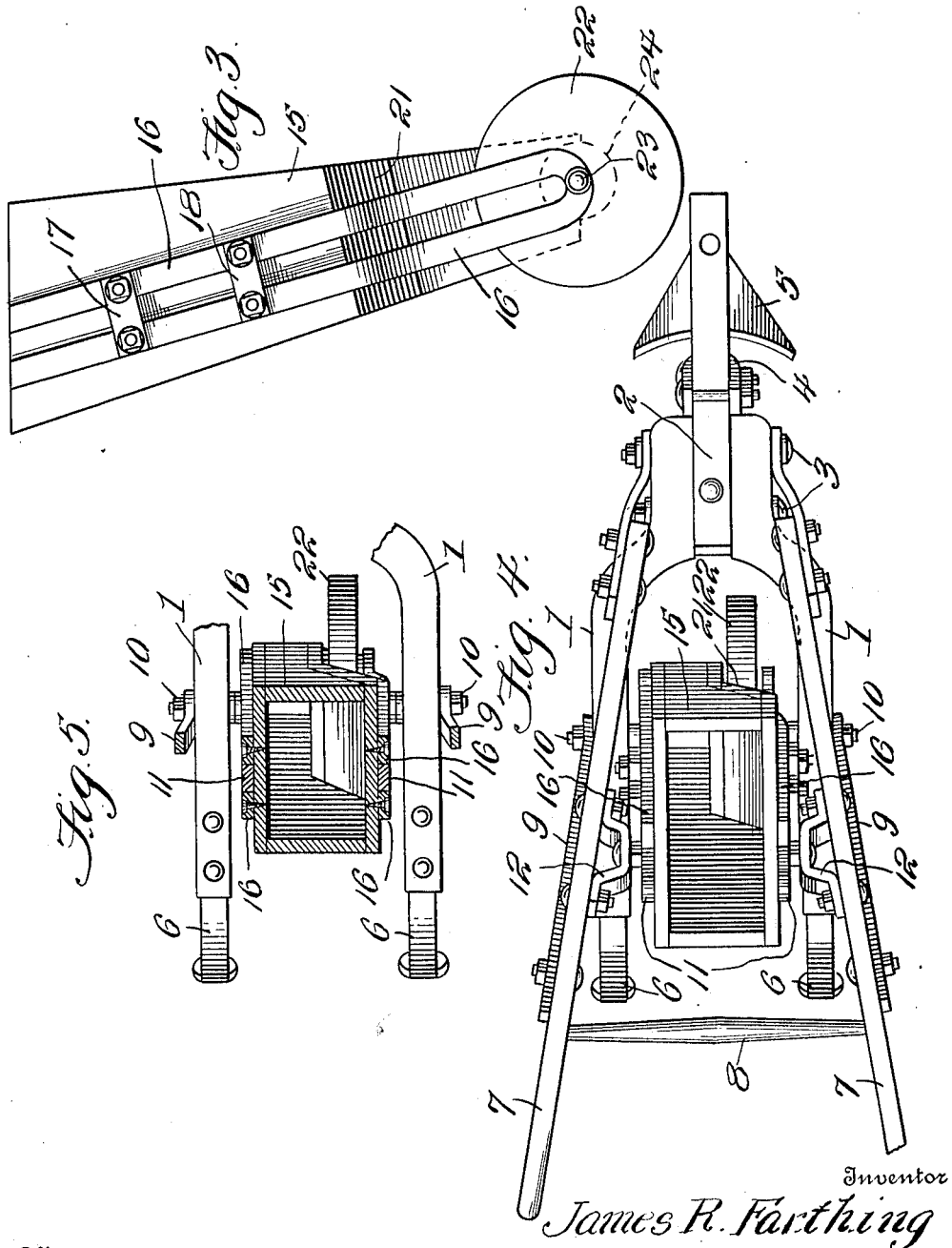

UNITED STATES PATENT OFFICE.

JAMES R. FARTHING, OF GARFIELD, GEORGIA.

SEED-PLANTER.

1,035,781. Specification of Letters Patent. Patented Aug. 13, 1912.

Application filed August 5, 1911. Serial No. 642,442.

*To all whom it may concern:*

Be it known that I, JAMES R. FARTHING, a citizen of the United States, residing at Garfield, in the county of Emanuel and State of Georgia, have invented new and useful Improvements in Seed-Planters, of which the following is a specification.

This invention relates to seed planters for planting peas, corn and other seeds, and it has particular reference to that class of seed planters in which the hopper is capable of vertical movement with reference to the frame, in order that the furrow opener and coverers may operate at a constant depth in the ground, while the hopper and planting mechanism will adapt itself to inequalities in the ground.

The present invention has for its object to simplify and improve the construction of a planter of the class referred to and to provide simple and improved means for supporting a vertically movable hopper.

A further object of the invention is to provide simple and improved means whereby the extent of vertical movement of the hopper may be adjusted and regulated.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a side elevation of a seed planter constructed in accordance with the invention. Fig. 2 is a vertical transverse sectional view taken on the line 2—2 in Fig. 1. Fig. 3 is a side elevation showing the hopper removed from the frame. Fig. 4 is a top plan view. Fig. 5 is a horizontal sectional view taken on the line 5—5 in Fig. 1.

Corresponding parts in the several figures are denoted by like characters of reference.

The frame of the improved machine includes side beams or sills 1, 1 that converge forwardly and a draft member or tongue 2 which is secured between said side members by means of bolts 3, 3 extending transversely therethrough, said tongue being equipped with a standard 4 supporting a furrow opener 5, and said side members 1, 1 being provided at their rear ends with covering members 6, 6 of ordinary well known construction. Handles 7, 7 are connected at their lower ends with one of the bolts 3, and said handles are suitably connected and spaced apart near their upper ends by means of a round 8. Said handles are also connected with the side members by means of reinforcing braces 9, the lower ends of which are connected with the said side members by means of bolts 10 extending transversely therethrough. Said bolts also serve to secure the lower ends of uprights 11, the upper ends of which are firmly bolted upon brackets 12, said brackets being bolted or otherwise suitably secured upon the inner faces of the handle members 7. The hopper 15, which may be of any suitable size, is provided with elongated U-shaped guide members 16 secured exteriorly upon the side faces thereof, the limbs of said U-shaped guide members being suitably spaced apart to accommodate between them the uprights 11 with which the hopper is in this manner slidably associated, the limbs of each of the U-shaped brackets being connected together by cross bars 17, 18, whereby the hopper is connected with the uprights 11 in such a manner as to be capable of free slidable movement, as will be readily understood. Such movement, however, may be limited and regulated by means of stop members consisting of set screws 19, the latter being engaged with apertures 20 in the uprights 11, each of said uprights being provided with a plurality of such apertures, and the stop member being placed in engagement with one of said apertures disposed intermediate the cross bars 17 and 18, which latter will coöperate with the stop members to limit the vertical sliding movement of the hopper.

The hopper is provided near its lower end with an offset 21 to accommodate a transporting and operating wheel 22 which is mounted upon a shaft or axle 23 which is supported for rotation in the lower ends of the U-shaped guide members 16, said wheel being also provided with a hub 24 having one or more seed cups or recesses 25 for the reception of seed, which by the rotation of the wheel and hub will be taken from the hopper and deposited in the furrow formed by the furrow opener. If more than one of the seed cups or recesses 25 are provided such cups or recesses as may not be required for present use may be plugged by means of a cork or stopper, and in this manner the distance between the hills planted by the machine may be regulated, as will be readily understood. It is obvious that the distance between the hills where charges of seed are deposited will be governed by the diameter of the wheel and by the number of seed cups or recesses in the hub thereof.

From the foregoing description, taken in connection with the drawings hereto annexed, the operation and advantages of this invention will be readily understood by those skilled in the art to which it appertains. It will be seen that the hopper is slidably associated with the frame and that it will, therefore, adapt itself to such inequalities as may exist in the ground while the furrow opener and the coverers operate at a constant depth. It will also be seen that the extent of movement of the hopper and the location of the latter is capable of being easily and conveniently regulated by proper adjustment of the stop members consisting of the set screws 19.

The general construction of the improved device is simple and thoroughly efficient for the purposes for which it is provided.

Having thus described the invention, what is claimed as new, is:—

1. In a seed planter, a frame having side members, handles connected at their lower ends with said side members, braces connecting the upper ends of the handles with the side members, uprights connected at their lower ends with the side members, brackets upon the inner faces of the handles with which the upper ends of the uprights are connected, and a hopper having U-shaped guides slidably engaging the uprights.

2. In a seed planter, a frame having handles, uprights associated with the frame and spaced from the inner faces of the handles, a hopper having U-shaped guide members slidably engaging the uprights, cross bars extending across the uprights and connecting the limbs of the U-shaped guide members, and stop members adjustably engaging the uprights intermediate the said cross bars.

3. In a seed planter, a frame comprising forwardly converging side members, a draft member included between the front ends of the side members, connecting bolts extending therethrough, handles associated at the lower end with one of said connecting bolts, braces extending from the handles to the side members, transverse bolts connecting said braces with the side members, uprights secured at their lower ends upon said transverse bolts, brackets secured upon the inner faces of the handles and connected with the upper ends of the uprights, a hopper having U-shaped guide members engaging the uprights, cross bars connecting the limbs of the U-shaped guide members and confining the uprights, and an earth-engaging wheel mounted for rotation between the lower ends of the U-shaped guide members and having a hub provided with seed cups.

In testimony whereof I affix my signature in presence of two witnesses.

JAMES R. FARTHING.

Witnesses:
C. S. BLAND,
R. J. WALSH.

Copies of this patent may be obtained for five cents each, by addressing the "Commissioner of Patents, Washington, D. C."